US012000554B2

(12) United States Patent
Stopper et al.

(10) Patent No.: US 12,000,554 B2
(45) Date of Patent: Jun. 4, 2024

(54) LIGHTING APPARATUS FOR A MOTOR VEHICLE AND ASSEMBLY OF THE COMPONENTS OF THE LIGHTING APPARATUS

(71) Applicant: Marelli Automotive Lighting Reutlingen (Germany) GmbH, Reutlingen (DE)

(72) Inventors: Ralf Stopper, Rottenburg Am Neckar (DE); Christian Lange, Pfullingen (DE); Fan Lu, Böblingen (DE); Lothar Pfitzner, Reutlingen (DE); Daniel Wagner, Reutlingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 18/068,178

(22) Filed: Dec. 19, 2022

(65) Prior Publication Data

US 2023/0194062 A1 Jun. 22, 2023

(30) Foreign Application Priority Data

Dec. 22, 2021 (DE) ......................... 102021134391.7

(51) Int. Cl.
*F21S 41/19* (2018.01)
*F21S 41/29* (2018.01)
(Continued)

(52) U.S. Cl.
CPC ............. *F21S 41/198* (2018.01); *F21S 41/29* (2018.01); *F21S 41/295* (2018.01); *F21V 17/005* (2013.01);
(Continued)

(58) Field of Classification Search
CPC ....... F21S 41/29; F21S 41/295; F21V 17/104; F21V 17/005; F21V 17/10; F21V 17/107;
(Continued)

(56) References Cited

U.S. PATENT DOCUMENTS 9,857,046 B2 * 1/2018 Abe ........................ F21S 45/10
10,378,733 B1 8/2019 McLellan
(Continued)

FOREIGN PATENT DOCUMENTS

CN 111102531 A 5/2020
DE 102004062990 A1 7/2006
(Continued)

OTHER PUBLICATIONS

Machine translation of DE 102018209468 A1 retrieved from the FIT database of PE2E search. (Year: 2023).*
(Continued)

*Primary Examiner* — Colin J Cattanach
(74) *Attorney, Agent, or Firm* — Howard & Howard Attorneys PLLC

(57) ABSTRACT

A lighting apparatus for a motor vehicle, wherein a first structural component of the lighting apparatus is connected to a second structural component of the lighting apparatus, and the connection between the first and second structural components is formed by a twist-on connection. The second structural component comprises at least two coupling elements that fit over, in particular at the perimeter of, the first structural component in the fully assembled state, at least in part, and the first structural component ends up in this engaged position, in particular on the perimeter thereof, through a rotation in relation to the second structural component.

8 Claims, 5 Drawing Sheets

(51) Int. Cl.

| | |
|---|---|
| ***F21V 17/00*** | (2006.01) |
| ***F21V 17/10*** | (2006.01) |
| ***F21V 17/12*** | (2006.01) |
| ***F21V 17/14*** | (2006.01) |
| ***F21V 17/16*** | (2006.01) |
| ***F21V 17/18*** | (2006.01) |

(52) U.S. Cl.
CPC ............. *F21V 17/10* (2013.01); *F21V 17/104* (2013.01); *F21V 17/107* (2013.01); *F21V 17/12* (2013.01); *F21V 17/14* (2013.01); *F21V 17/16* (2013.01); *F21V 17/164* (2013.01); *F21V 17/166* (2013.01); *F21V 17/168* (2013.01); *F21V 17/18* (2013.01)

(58) Field of Classification Search
CPC .......... F21V 17/14; F21V 17/18; F21V 17/12; F21V 17/16; F21V 17/164; F21V 17/166; F21V 17/168
See application file for complete search history.

(56) References Cited

U.S. PATENT DOCUMENTS

| | | | |
|---|---|---|---|
| 2008/0117647 A1 | 5/2008 | Behr et al. | |
| 2012/0106177 A1 | 5/2012 | Blankestijn et al. | |
| 2016/0201882 A1 | 7/2016 | Liu et al. | |
| 2017/0043706 A1* | 2/2017 | Shibata ................ | B60Q 1/0433 |
| 2022/0221136 A1* | 7/2022 | Wilz ......................... | F21V 7/00 |

FOREIGN PATENT DOCUMENTS

| | | | |
|---|---|---|---|
| DE | 202010003680 U1 | | 7/2010 |
| DE | 102018209468 A1 | * | 12/2019 |
| DE | 102020112963 B3 | | 10/2021 |
| EP | 0936402 A1 | | 8/1999 |
| EP | 2385298 A1 | | 11/2011 |
| EP | 3135535 A1 | | 3/2017 |
| FR | 3056700 A1 | | 3/2018 |
| GB | 191300843 A | | 1/1914 |

OTHER PUBLICATIONS

Search Report for German Patent Application No. 102021134391.7 dated Jul. 8, 2022.
Communication dated Apr. 26, 2023 for European Patent Application No. 22213985.9 enclosing the European Search Report dated Apr. 18, 2023.

* cited by examiner

LIGHTING APPARATUS FOR A MOTOR VEHICLE AND ASSEMBLY OF THE COMPONENTS OF THE LIGHTING APPARATUS

CROSS-REFERENCE TO RELATED APPLICATIONS

The present application claims priority to and all the benefits of German Patent Application No. 10 2021 134 391.7, filed on Dec. 22, 2021, which is hereby expressly incorporated herein by reference in its entirety.

BACKGROUND OF THE INVENTION

1. Field of the Invention

The invention relates to a lighting apparatus for a motor vehicle in which a first structural component of the light module is connected to a second structural component of the light module.

Lighting apparatuses in which a first structural component such as a cover plate or lens is connected to a second structural component such as a housing or lens holder are known from the prior art.

2. Description of the Related Art

By way of example, a lighting apparatus is known from DE 20 2010 003 680 U1 in which a lens is attached to a lens holder with a bracket. Furthermore, lenses are attached to a lens mount with snap-fit connections in the prior art. The lens is pushed into the lens mount from the front with a translatory motion during the assembly. The snap-fit component is first deflected and then snaps in place around the lens. Plastic lenses may have a partition line. The snap-fit component slides over this partition line during the assembly. This may result in some material breaking off, and small particles unfortunately ending up in the lighting apparatus.

SUMMARY OF THE INVENTION

The object of the invention is to attach and position a first structural component of the light module and a second structural component of the light module, and to overcome the disadvantages of the prior art.

These problems are solved according to the invention in that the connection between the first and second structural components is formed by a twist-on connection in which the second structural component comprises at least two coupling elements that at least partially fit over the perimeter of, the second structural component in the assembled state, and the first structural component engages with the second structural component when it is rotated, in particular on the perimeter thereof.

The first structural component is a lens or cover plate, for example. The second structural component is a lens mount or housing, for example, in which a part of the lighting apparatus is contained.

The first structural component forms a planar component extending in the x-y plane. The extension of the first structural component along the x-axis and/or y-axis is greater than its extension along the z-axis, for example. The first structural component can also have a greater extension along the z-axis than along the x-axis and/or y-axis. This may be the case with thick wall optics for example.

The first structural component is rotated in relation to the second structural component during assembly in order to position the first structural component in relation to the second structural component in the fully assembled state. This rotation takes place in the x-y plane.

Prior to the rotation, or simultaneously therewith, the first structural component can be moved in a translatory manner along the z-axis in relation to the second structural component.

The coupling elements on the second structural component, which fit at least in part over the first structural component, in particular at its perimeter, secure the first and second components to one another along the z-axis.

The coupling elements on the second structural component in one embodiment are at least partially in the form of hooks, in particular snap-fit elements. These hook-shaped coupling elements can advantageously be first deflected during assembly, and they subsequently "snap back," such that they are then in the final assembly position. They are deflected at least at least in part along the z-axis.

It may be advantageous for the first structural component to have at least two guide bevels that interact with the coupling elements on the second structural component during the assembly such that the respective coupling elements are deflected by the respective guide bevels during assembly. This deflection by the guide bevels takes place along the z-axis, by way of example.

It may be advantageous for the first structural component to have at least two bearing surfaces for the respective coupling elements on the second structural component that interact with the respective coupling elements on the second structural component when in the fully assembled state. The bearing surfaces are lower than the guide bevels along the z-axis, by way of example. The coupling elements then "snap" back in place toward the bearing surfaces after they are deflected by the guide bevels.

The first structural component in one embodiment has at least one stop element for at least one coupling element on the second structural component, which prevents the first structural component from being rotated too far in relation to the second structural component during assembly. The stop element protrudes along the z-axis in relation to at least one of the bearing surfaces. This prevents the first structural component from being "over-rotated" in relation to the second structure component within the x-y plane. By way of example, this prevents a respective coupling element from being rotated past its end position once it bears on a respective bearing surface and has therefore reached its fully assembled position.

The first structural component in one embodiment comprises at least one guide element on a side facing the second structural component, in particular a guide surface that faces outward, which interacts with at least one guide element on the second structural component during assembly.

The second structural component in one embodiment comprises at least one positioning element, which defines the position of the second structural component in relation to the first structural component in the fully assembled state, in particular such that it is secured in place.

The positioning element on the second structural component is a latching element in one embodiment, in particular a snap-fit hook.

The first structural component in one embodiment comprises at least one positioning element, in particular a positioning ridge, which interacts with the positioning element on the second structural component in the fully assembled state.

The first structural component is a lens or cover plate, for example, which has an elliptical or circular perimeter in the x-y plane, in particular. The shape of the second structural component, a lens mount or housing, corresponds thereto.

Further advantages can be derived from the following description, the drawings, and the dependent claims. It is to be understood that the features specified above and explained below can be used not only in the combinations described herein, but also in other combinations or in and of themselves.

Exemplary embodiments of the invention are illustrated in the drawings and shall be described in greater detail in the following description.

DETAILED DESCRIPTION OF THE INVENTION

Figure 1:
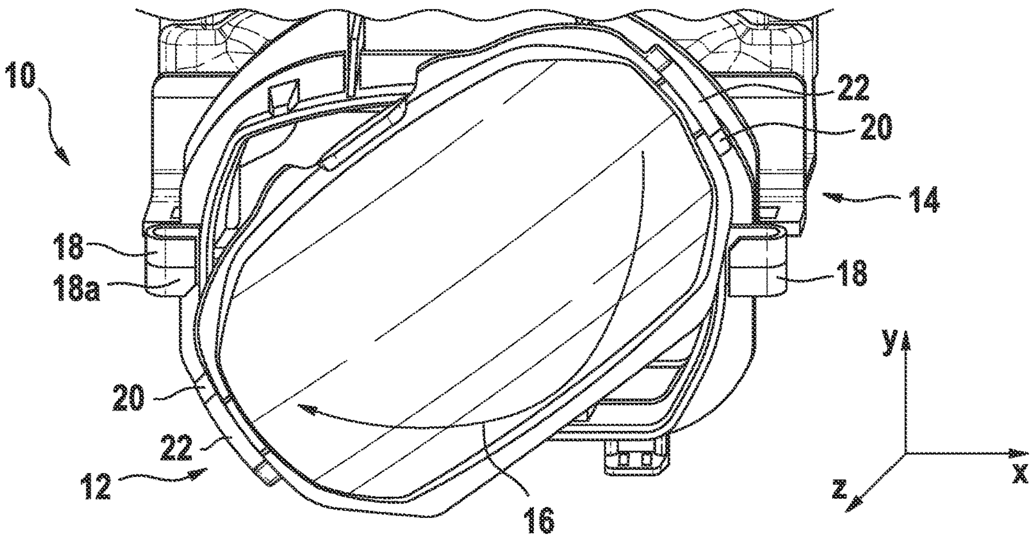
FIG. 1 shows a lighting apparatus according to the invention during assembly.
Figure 2:
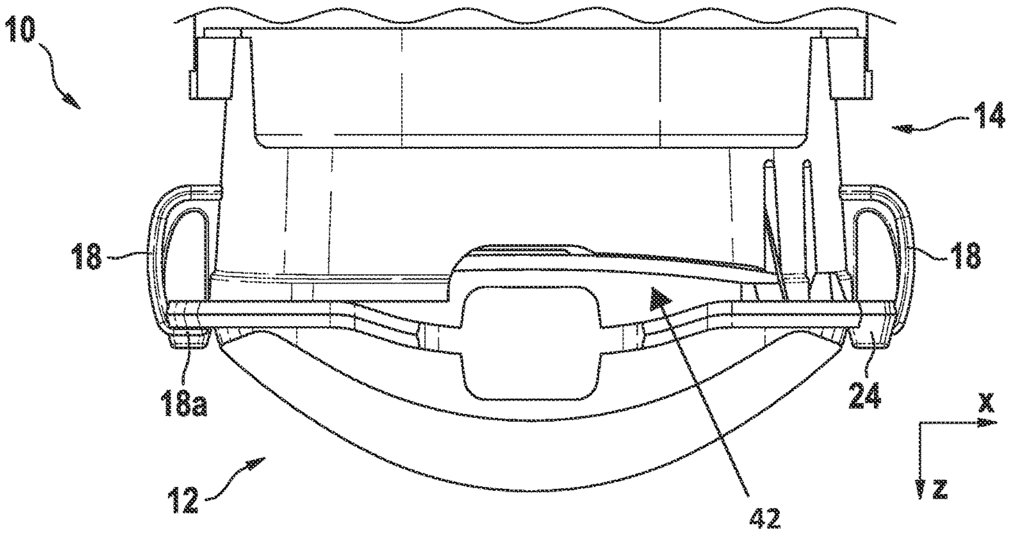
FIG. 2 shows a lighting apparatus according to the invention after it has been fully assembled.

FIG. 1 shows a lighting apparatus 10 during assembly. FIG. 2 shows the lighting apparatus 10 when fully assembled.

The lighting apparatus 10 comprises a first structural component 12 and a second structural component 14.

The first structural component 12 is a lens in the embodiment shown here.

The second structural component 14 is a lens mount in the embodiment shown here.

The first and second structural components 12, 14 are attached to one another, or connected to one another, through a twist-on connection.

The first structural component is rotated in relation to the second structural component during assembly in order to bring the first structural component and second structural component into a final assembly position. This rotation takes place in the x-y plane. The rotation is indicated in FIG. 1 by the arrow 16.

The second structural component 14 comprises two coupling elements 18 in this embodiment. Three or more coupling elements 18 can also be advantageously used. When there are two coupling elements 18, they are advantageously located opposite one another over the circumference of the second structural component in the x-y plane.

The coupling elements 18 fit over the first structural component, in particular at its perimeter, at least in part in the final assembly position.

The first structural component 12 ends up in this engagement, in particular at its perimeter, through the rotation in relation to the second structural component 14.

The coupling elements 18 on the second structural component 14, which fit at least in part over the first structural component, in particular at its perimeter, secure the first and second structural components 12, 14 in relation to one another along the z-axis.

The coupling elements 18 on the second structural component 14 form hooks in the embodiment shown here, in particular in the form of snap-fit hooks. The hook-shaped coupling elements 18 are first deflected during assembly, and subsequently “snap” back in place, thus ending up in the final assembly position. The deflection of the coupling element 18 takes place at least in part along the z-axis, by way of example. At least part 18*a* of the coupling element 18 extending in the x-y plane in this embodiment is deflected along the z-axis during assembly.

The first structural component 12 in this embodiment comprises at least two guide bevels 20 that interact with the respective coupling elements 18 on the second structural component 14 during the assembly. A respective coupling element 18 comes in contact with a respective guide bevel 20 during assembly in the course of the rotation 16, such that the part 18*a* of a respective coupling element 18 is deflected along the z-axis on the guide bevel 20.

As the rotation continues, the respective coupling element 18 passes over the respective guide bevel and comes to bear on a respective bearing surface 22 on the first component 12.

The bearing surfaces 22 are lower than the guide ramps 20 along the z-axis. The coupling elements 18 “snap” back into place, toward the bearing surfaces 22 after the deflection by the guide bevels 20.

The coupling elements 18 bearing on the bearing surfaces 22 act on the first structural component 12 along the z-axis, such that the first structural component is secured in place in relation to the second structural component 14 by the twist-on connection. The coupling elements 18 are advantageously designed such that a sufficient retaining force is generated, while it is still possible to compensate for tolerances.

The first structural component 12 also comprises two stop elements 24 in this embodiment. The stop elements 24 prevent the first structural component 12 from being rotated too far in the direction of the arrow 16 in relation to the second structural component 14 during assembly.

By way of example, the stop element 24 can prevent a respective coupling element 18, which already bears on a respective bearing surface 22 and is therefore in the final assembly position, from being rotated beyond this final assembly position.

Figure 9A:
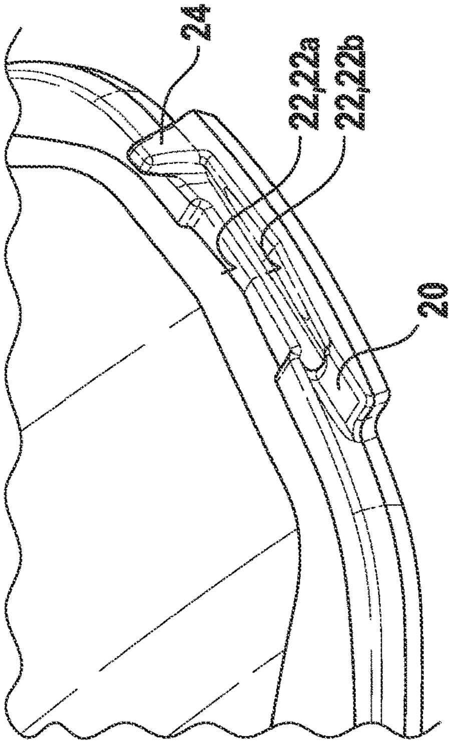
FIGS. 9A to 9C show details of the first structural component shown in FIG. 7 and FIG. 8.
Figure 9B:
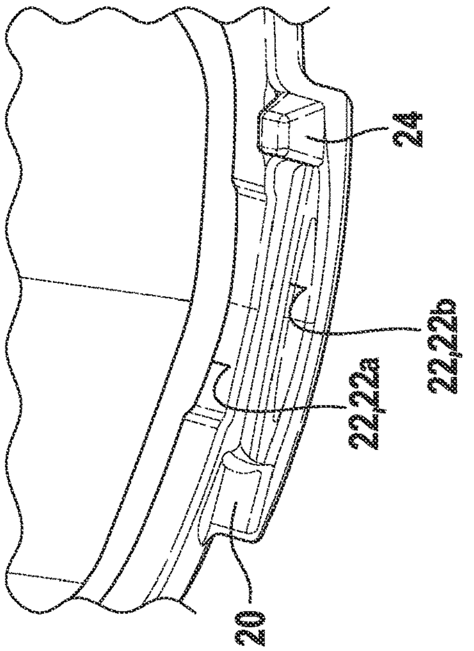
Figure 9C:
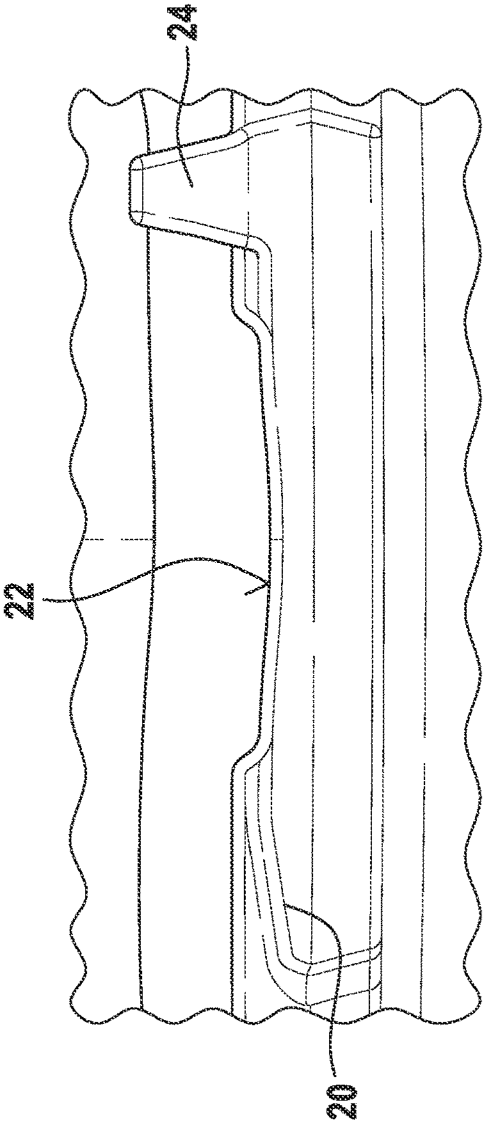

In accordance with the embodiment shown in FIGS. 9*a* to 9*c*, the bearing surface 22 on the first structural component can also be formed by two bearing surfaces 22*a*, 22*b*. The bearing surfaces 22*a*, 22*b* are offset to one another along the z-axis in this embodiment. It can be seen in FIG. 6 that the coupling element 18 comprises a projection 18*c*, which corresponds to the two bearing surfaces 22*a*, 22*b* on the part 18*a*.

Instead of the two bearing surfaces 22*a* and 22*b* that are offset to one another along the z-axis, the bearing surface can also be formed by a single bearing surface 22.

The first structural component 12 in this embodiment comprises at least one guide element 28 on a side facing the second structural component, in particular a guide surface 28 that faces outward. The guide element 28 on the first structural component 12 interacts with the at least one guide element 30 on the second structural component 14 during assembly. The guide element 28 on the first structural component 12 can be seen in FIGS. 7 and 8, by way of example. The guide element 28 is formed by a curved or bowed guide surface 28 or portion of a surface, by way of example.

Figure 3:
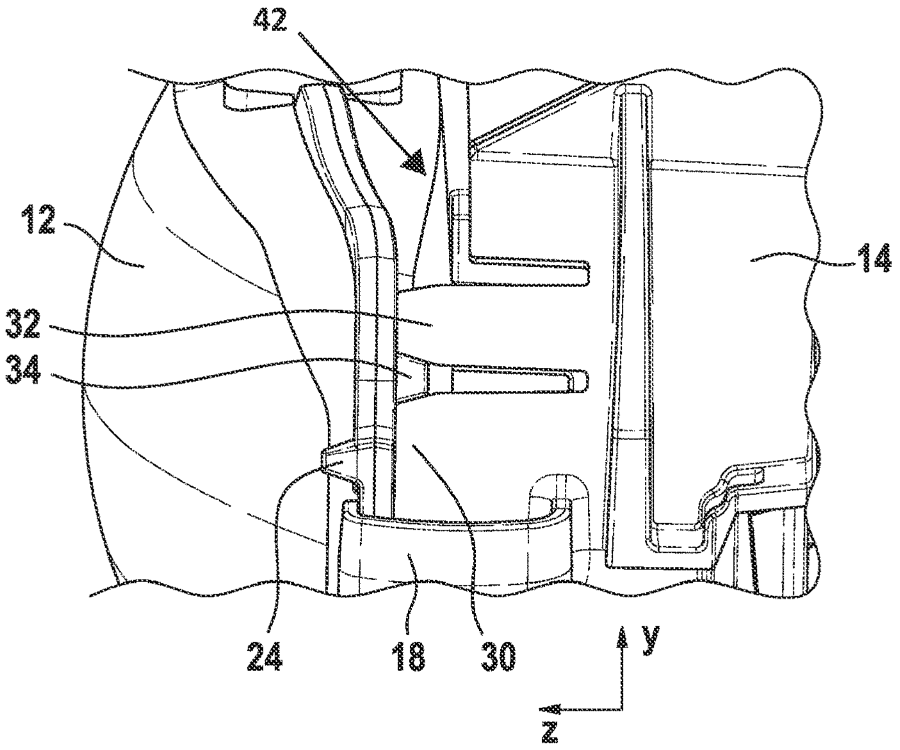
FIG. 3 shows a detail of the lighting apparatus according to the invention shown in FIG. 2.

This guide surface 28 comes in contact with the guide element 30 on the second structural component 14 during the assembly. The guide element 30 on the second structural component 14 can be seen in FIGS. 3 to 5, by way of example.

The first and second structural components are first moved toward one another in a translatory manner along the z-axis during the assembly, in particular such that they pushed together.

Figure 6:
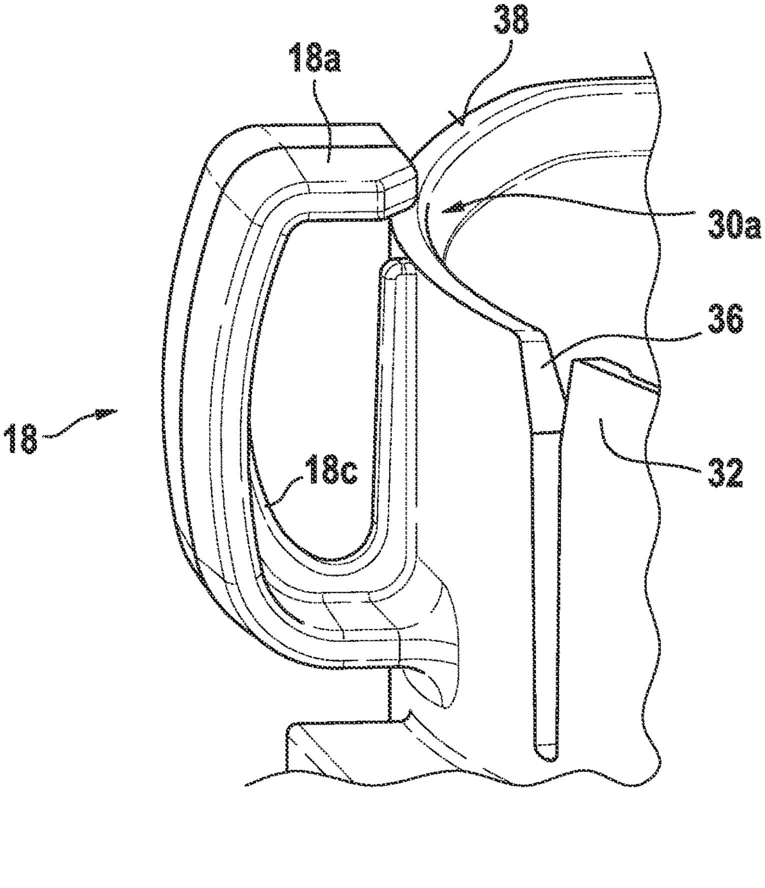
FIG. 6 shows a detail of a second structural component in the lighting apparatus according to the invention.
Figure 7:
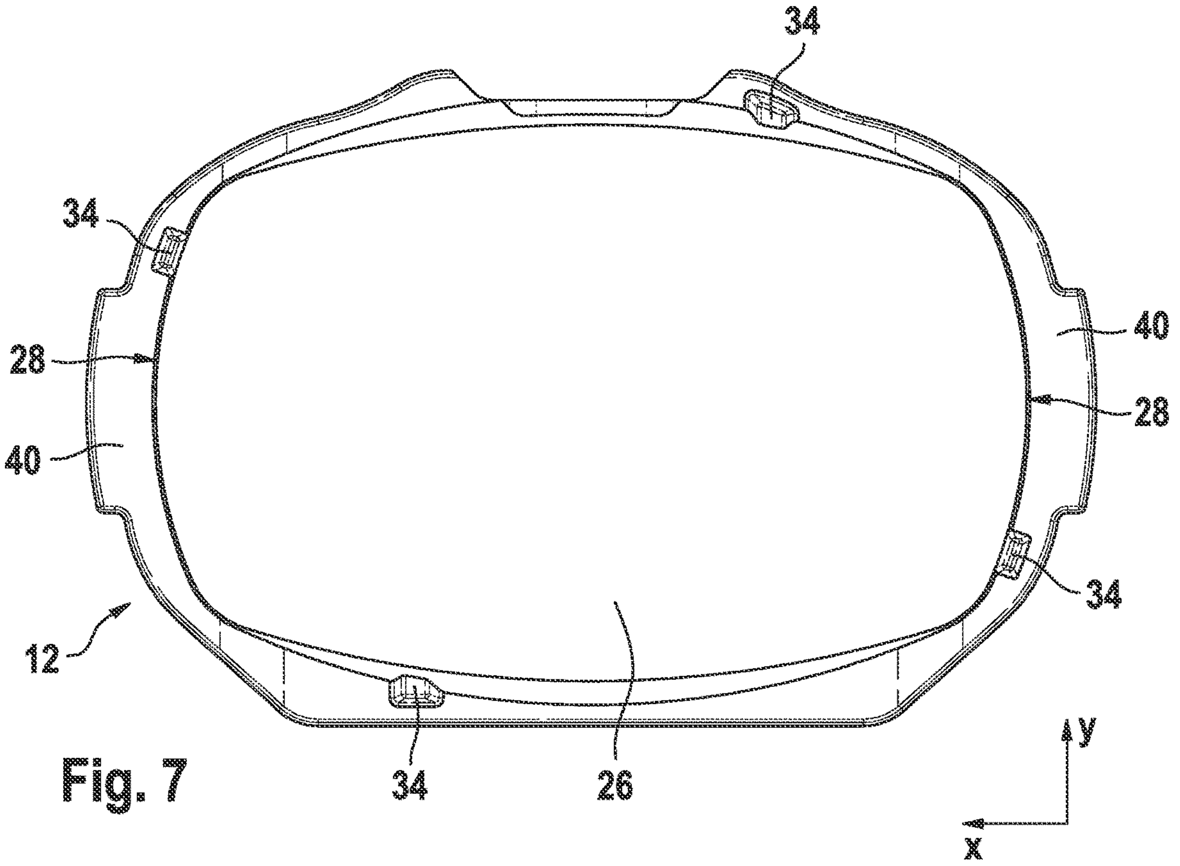
FIG. 7 shows one view of a first structural component in the lighting apparatus according to the invention.
Figure 8:
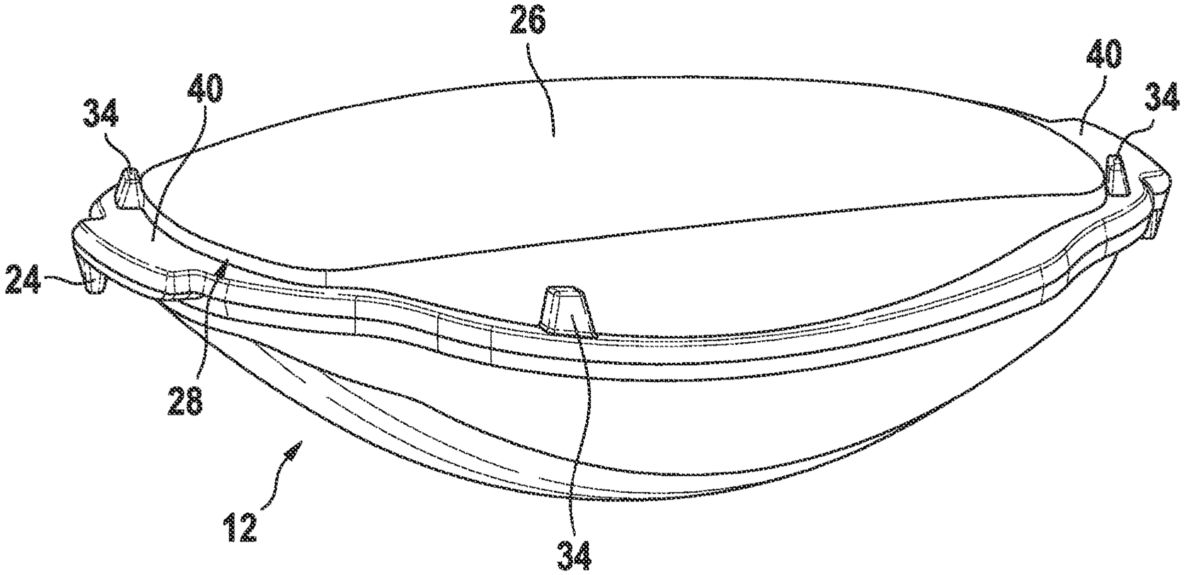
FIG. 8 shows another view of the first structural component shown in FIG. 7.

An edge surface 38 on the second structural component 14, or a segment of the edge surface 38, extending in the x-y plane in particular, comes in contact with a portion of a surface 40 on the first structural component that also extends in the x-y plane during the translatory movement, see FIGS. 6, 7 and 8.

Consequently, the guide surface 28 also comes in contact with the guide element 30 on the second structural component 14.

The edge surface 38 on the second structural component 14, or the segment of the edge surface 38, does not run over the entire circumference of the second structural component 14 in the x-y plane. There is at least one recess 42, or two recesses, on the edge along the circumference of the second structural component 14, which lie opposite one another over the circumference of the second structural component 14. This recess 42, or these recesses, form one or more edge segment(s) 42 that are lower than the edge surface 38 or segment of the edge surface 38 along the z-axis on the second structural component 14. The edge surface 38 therefore does not form a continuous bearing surface for the first structural component 12. This recess 42 is shown by way of example in FIGS. 2 to 5, on the upper surface of the second structural component 14 when it is in the assembled state.

The first structural component comprises the surface portion 40 that comes in contact with the respective edge surface segment 38 on the second structural component 14.

The first structural component 12 extends beyond the surface portion 40 along the z-axis on the side facing the second structural component 14 when it is oriented in the assembly position. By way of example, FIGS. 2, 3, 5, 7 and 8 show that the lens 14 extends along the z-axis beyond the surface portion 40 when oriented in the assembly position. The lens 14 is curved, for example, such that it extends beyond the surface portion 40.

The recess 42 or recesses on the second structural component 14 allow the surface portion 40 on the first structural component 12 to come in contact with the edge surface segment 38 or edge surface segments 38 on the second structural component despite the extension of the first structural component 12 beyond this surface portion 40 as a result of the recesses 42 in the edge, which are lower than the edge surface portion 38 along the z-axis, such that the first and second structural components can be joined together.

The components are then rotated as indicated by reference numeral 16.

The guide element 30 is a curved or bowed edge segment 30 on the first structural component, and the guide surface 28 comes in contact with an inner surface 30*a* of this edge segment 30 during assembly. During the rotation 16, the guide surface 28 slides over the inner surface 30*a* on the edge segment.

Advantageously, the first structural component 12 has two guide elements 28, and the second structural component 14 also has two corresponding guide elements 30. The guide elements 28, 30 are advantageously located opposite one another in the x-y plane over the circumferences of the respective structural components 12, 14. There can also be more guide elements 28, 30. In this case, it is advantageous when the guide elements 28, 30 are distributed evenly over the respective circumferences.

The second structural component 14 also comprises at least one positioning element 32 in this embodiment, and this positioning element 32 defines the position of the second structural component in relation to the first structural component when fully assembled, in particular securing it in place. There can also be two or more such positioning elements 32. If there are two or more positioning elements 32, they are advantageously distributed over the circumference of the second structural component. If there are two positioning elements 32, they can be placed opposite one another, for example. If there are more positioning elements 32, it is advantageous if these positioning elements 32 are distributed evenly over the circumference.

The positioning element 32 on the second structural component 14 in one embodiment form a latching element 32, in particular a snap-fit hook. The latching element 32 can be deflected outward in the x-y plane in particular.

The first structural component 12 in this embodiment comprises at least one positioning element 34, in particular a positioning ridge 34. The positioning element 34 on the first structural component 12 interacts with the positioning element 32 on the second structural component 14 when in the fully assembled state. This is illustrated by way of example in FIGS. 3 and 5.

Figure 4:
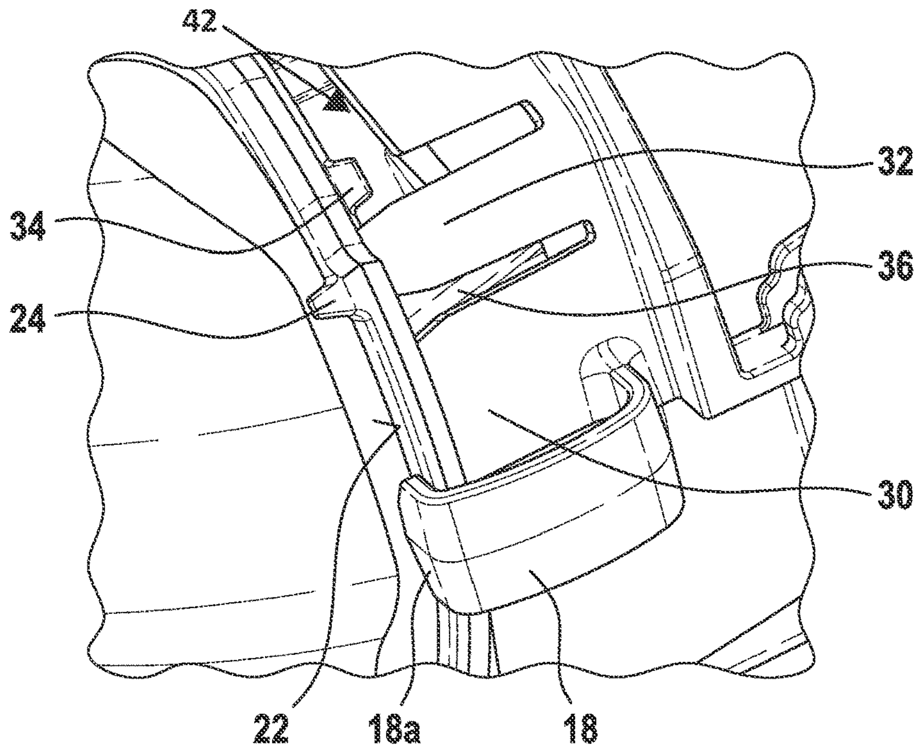
FIG. 4 shows the detail from FIG. 3 during assembly.
Figure 5:
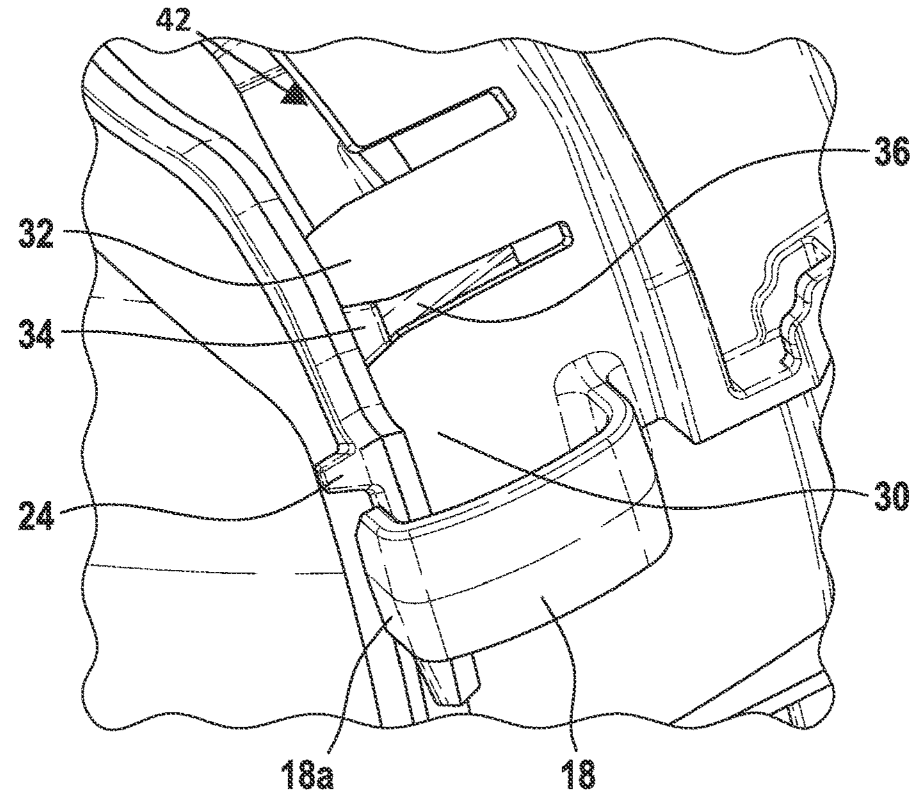
FIG. 5 shows the detail from FIG. 4 after assembly is completed.

When rotated during the assembly, the positioning element 32 on the second structural component 14 is deflected outward in the x-y plane against a respective positioning element 34 on the first structural component 12, and subsequently snaps back into the initial position when the components are rotated further, see FIGS. 4 and 5. When fully assembled, the positioning element 34 on the first structural component 12 is located in front of the positioning element 32 on the second structural component 14 in the direction of rotation 16. There is a recess 36 between the positioning element 32 and the guide element 30 on the second structural component 14 in this embodiment, in which the positioning element 34 on the first structural component 12 is located when in the assembled state.

A positioning of the first and second structural components in relation to one another is defined by the positioning elements 32, 34. The first structural component 12 is advantageously centered in relation to the second structural component 14.

It has proven to be advantageous when all of the elements of the first and/or second structural components 12, 14 described herein are integrally formed elements of the respective components 12, 14.

The respective structural components 12, 14 are produced by way of example in an injection molding procedure.

The figures show a first structural component with an elliptical form in the x-y plane. The embodiments described herein can also be used analogously with first structural components that are circular in the x-y plane.

Any x-y planes referred to in the description are not limited to coordinate planes or the plane of origin. This plane can also be a parallel plane, when this makes sense in the corresponding context.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A lighting apparatus for a motor vehicle comprising a first structural component of the lighting apparatus that is connected to a second structural component of the lighting apparatus, wherein the connection between the first and second structural components is formed by a twist-on connection, wherein the second structural component comprises at least two coupling elements that are deflectable along a z-axis and that fit along the z-axis at least partly over the perimeter of the first structural component in the fully assembled state, and the first structural component is deployable in an engaged position at the perimeter thereof, through a rotation in an x-y plane in relation to the second structural component, and wherein the second structural component comprises an edge surface extending in an x-y plane and at least one recess that is lower than the edge surface along the z-axis, and the first structural component includes a surface portion facing towards the edge surface of the second component and extending in the x-y plane, wherein the edge surface of the second structural component comes in to contact with the surface portion of the first structural component through a translatory movement, wherein the first structural component extends beyond the surface portion along the z-axis on the side facing the second structural component when it is oriented in the assembly position, and wherein the second structural component comprises at least one positioning element protruding toward the surface portion of the first structural component, the at least one positioning element on the second structural component being a snap-fit hook and being deflectable outward in the x-y plane, and wherein the first structural component comprises at least one positioning ridge protruding from the surface portion towards the second structural component, wherein the positioning ridge interacts with the positioning element of the second structural component in a fully assembled state, and the positioning element defines the position of the second structural component in relation to the first structural component in the fully assembled state, thereby securing the first structural component in place.

2. The lighting apparatus as set forth in claim 1, wherein the coupling element on the second structural component is at least partially in the form of a hook.

3. The lighting apparatus as set forth in claim 1, wherein the first structural component comprises at least two guide bevels that interact with a respective coupling element on the second structural component during the assembly, wherein a respective coupling element is deflected by a respective guide bevel during the assembly.

4. The lighting apparatus as set forth in claim 1, wherein the first structural component comprises at least two bearing surfaces for respective coupling elements on the second structural component, which interact with the respective coupling elements on the second structural component in the fully assembled state.

5. The lighting apparatus as set forth in claim 1, wherein the first structural component comprises at least one stop element for at least one coupling element on the second structural component, wherein the stop element prevents the first structural component from being rotated too far in relation to the second structural component during assembly.

6. The lighting apparatus as set forth in claim 1, wherein the first structural component comprises at least one guide element, in particular a guide surface that faces outward, on a side facing toward the second structural component, which interacts with at least one guide element on the second structural component during assembly.

7. The lighting apparatus as set forth in claim 1, wherein the first structural component comprises at least one positioning ridge, wherein the positioning ridge interacts with the positioning element on the second structural component in the fully assembled state.

8. The lighting apparatus as set forth in claim 1, wherein the first structural component forms a lens, and the second structural component forms a lens mount.

* * * * *